(12) United States Patent
Young et al.

(10) Patent No.: US 8,769,008 B1
(45) Date of Patent: Jul. 1, 2014

(54) METHOD AND SYSTEM FOR PROVIDING PREFERENCE BASED CONTENT TO A LOCATION AWARE MOBILE DEVICE

(75) Inventors: Michael Alan Young, New York, NY (US); Nick Bilton, Brooklyn, NY (US)

(73) Assignee: The New York Times Company, New York, NY (US)

( * ) Notice: Subject to any disclaimer, the term of this patent is extended or adjusted under 35 U.S.C. 154(b) by 597 days.

(21) Appl. No.: 11/952,247

(22) Filed: Dec. 7, 2007

(51) Int. Cl.
  *G06F 15/16* (2006.01)
(52) U.S. Cl.
  USPC ............ 709/204; 709/201; 709/205; 709/206
(58) Field of Classification Search
  CPC .......... G06F 17/30905; G06F 17/3005; G06F 17/30867; H04L 67/04; H04W 4/18
  See application file for complete search history.

(56) References Cited

U.S. PATENT DOCUMENTS

| | | | |
|---|---|---|---|
| 6,493,758 B1* | 12/2002 | McLain | 709/227 |
| 7,024,464 B1* | 4/2006 | Lusher et al. | 709/219 |
| 7,346,668 B2* | 3/2008 | Willis | 709/219 |
| 7,668,653 B2* | 2/2010 | Habaguchi | 701/209 |
| 7,700,865 B1* | 4/2010 | Ho et al. | 84/477 R |
| 2003/0186662 A1* | 10/2003 | Himmel et al. | 455/185.1 |
| 2004/0201619 A1* | 10/2004 | Zervas | 345/746 |
| 2004/0202132 A1* | 10/2004 | Heinonen et al. | 370/331 |
| 2006/0184609 A1* | 8/2006 | Deng | 709/203 |
| 2006/0218479 A1* | 9/2006 | Torres | 715/500 |
| 2008/0062253 A1* | 3/2008 | Jaspersohn et al. | 348/14.11 |
| 2008/0096605 A1* | 4/2008 | Gissin et al. | 455/556.2 |

* cited by examiner

Primary Examiner — Krista Zele
Assistant Examiner — Matthew Lindsey
(74) Attorney, Agent, or Firm — Rothwell, Figg, Ernst & Manbeck, P.C.

(57) ABSTRACT

A system and method in accordance with exemplary embodiments may include receiving a message from a location-aware mobile device associated with a user, receiving content delivery information from the user, formulating a content package at least based on the content delivery information, and sending a content message associated with the content package to the location-aware mobile device via a network.

13 Claims, 6 Drawing Sheets

106

USER PROFILE INFORMATION

EMAIL

FIRST NAME

LAST NAME

PHONE #    CARRIER

} 404

402
ADD

METHOD AND SYSTEM FOR PROVIDING PREFERENCE BASED CONTENT TO A LOCATION AWARE MOBILE DEVICE

FIELD OF THE INVENTION

The present invention relates to systems and methods for providing preference based content to a location-aware mobile device.

BACKGROUND INFORMATION

People may regularly interact with multiple electronic devices to access, view, and/or manipulate information. For instance, one individual may use a desk top computer while at home to view information of interest made available on the Internet. The same individual may then use a mobile device to view the same information of interest while commuting from one location to another location. Even further, this individual may use a computer system, such as, a lap top computer while at a place of employment to view information of interest. Accordingly, accessing multiple electronic devices to view information of interest has become overly cumbersome and time consuming.

SUMMARY OF THE INVENTION

Accordingly, at least one embodiment may include a method comprising receiving a message from a location-aware mobile device associated with a user, receiving content delivery information from the user, formulating a content package at least based on the content delivery information, and sending a content message associated with the content package to the location-aware mobile device via a network.

Another embodiment according to this invention may provide a system. This embodiment may comprise a database for storing data associated with providing a content package, and a network element communicatively coupled to a network and is configured to receive data from a location-aware mobile device wherein the data comprises a message from a location-aware mobile device associated with a user, receive content delivery information from the user, formulate a content package at least based on the content delivery information, and send a content message associated with the content package to the location-aware mobile device via a network.

An additional embodiment according to this invention may provide a computer-accessible medium encoded with computer program code. The computer-accessible medium according to this embodiment may be effective to perform the following: receive a message from a location-aware mobile device associated with a user, receive content delivery information from the user, formulate a content package at least based on the content delivery information, and send a content message associated with the content package to the location-aware mobile device via a network. In addition, formulating the content package further comprises summarizing one or more content items based on at least the amount of time associated with the user's commute time.

These and other embodiments and advantages of the present invention will become apparent from the following detailed description, taken in conjunction with the accompanying drawings, illustrating by way of example the principles of the invention.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

FIG. 4 illustrates a user profile graphical user interface in accordance with exemplary embodiments;

Figure 1:
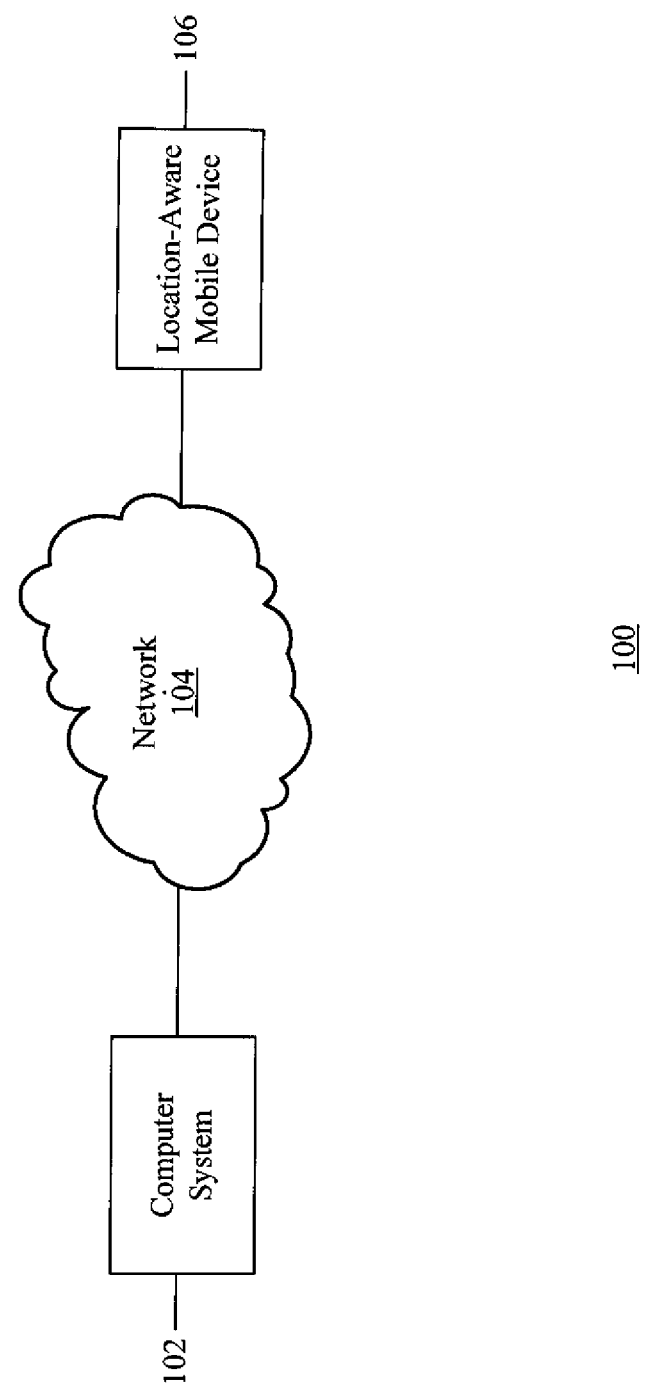
FIG. 1 illustrates a system in accordance with exemplary embodiments.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

The following description is intended to convey a thorough understanding of the embodiments described by providing a number of specific embodiments and details involving systems and methods for providing preference based content to a location-aware mobile device. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

The description below describes computer systems, mobile devices, and network elements that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., computer systems, mobile devices, and network elements, etc.) separately. The functions described as being performed at various components may be performed at other components, and the various components may be combined and/or separated. Other modifications also may be made.

According to various examples, a system is provided that allows users to seamlessly access content of interest, personal notes, and/or information associated with one or more locations using multiple electronic devices. For example, a user may be associated with a location-aware mobile device, such as, a cellular telephone. In addition, a user may be associated with a computer system that has location-aware reader capabilities, such as, a desk top computer system. Accordingly, when the location-aware mobile device is within a detectable proximity of the computer system, the system may detect the presence of the location-aware mobile device and launch a web browser. Using the web browser, the user may search for, access, view, and/or add content of interest, personal notes, and/or information associated with one or more locations.

In various exemplary embodiments, the web browser may access one or more web pages to display information associated with a user configuring content to be accessed via a location-aware mobile device. For example, to configure content the user may use a search feature associated with the one or more web pages to search for content of interest and/or information associated with one or more locations. Content of interest may include one or more web feeds associated with one or more news papers and/or content feeds, such as, the New York Times, Washington Post, Wall Street Journal, and/or any other information providing resource. Information associated with one or more locations may include a map to, hours of, and/or phone number of a particular place, such as, a place of business.

The user may then configure one or more search results by designating the one or more search results as content for subsequent packaging and delivery to a location-aware mobile device. The user may also create one or more personal notes and/or designate the one or more personal notes as content for subsequent packaging and delivery using the one or more web pages.

In various exemplary embodiments, the user may input an amount associated with the approximate length of time of a subsequent commute. Based on this amount of time, the system may package one or more search results and/or personal notes in a content package with a sufficient amount of information for the user to view the entire content package during his/her commute. In various embodiments, the system may use a summarization engine to summarize one or more search results to fit the allotted time.

Once the location-aware mobile device has been removed from a detectable proximity of the computer system, the system may automatically send an electronic message to the location-aware mobile device using a network. The electronic message may include one or more hyperlinks associated with the content package. By activating the one or more hyperlinks provided in the electronic message, the user may access and/or view the information provided in the content package for the duration of his/her commute using a display feature on the location-aware mobile device.

During the commute, a user may designate information provided in the content package as information they would like to view in its entire form upon returning to the computer system with location-aware reader capabilities. Once the presence of the location-aware mobile device is detected by the computer system, the system may launch a web browser displaying one or more web pages associated with the full versions of the information provided in the content package that has been designated for full version review by the user.

FIG. 1 illustrates a preference based content delivery system 100 in accordance with exemplary embodiments. The preference based content delivery system 100 may include one or more computer systems 102, one or more networks 104, and one or more location-aware mobile devices 106.

The preference based content delivery system 100 may be in communication with network 104. Network 104 may include an analog telephone network, a digital telephone network, a cellular telephone network, a public wide area network ("WAN"), such as the Internet, or, different connections, such as combinations of public and private WANs, local areas networks ("LANs"), wireless LANs, encrypted networks, body area networks, or other wired or wireless networks. In exemplary embodiments of the disclosure, network 104 may include one, or any number of the exemplary types of networks mentioned above operating as a stand-alone network or in cooperation with each other. Use of the term network herein is not intended to limit the network to a single network.

Computer system 102 and location-aware mobile device 106 may be in communication with or have access to one or more networks 104. For example, computer system 102 and location-aware mobile device 106 may communicate with each other using one or more networks 104.

Computer system 102 may include, but is not limited to: e.g., any computer device, or communications device including, e.g., a personal computer (PC), a workstation, a mobile device, a phone, a handheld PC, a personal digital assistant (PDA), a thin system, a fat system, network appliance, an Internet browser, a paging device, an alert device, a television, an interactive television, a receiver, a tuner, a high definition (HD) television, an HD receiver, a video-on-demand (VOD) system, a server, and/or any other device that is enabled with location-aware reader capabilities. Location-aware reader capabilities may include the capability to receive one or more signals and/or messages from one or more mobile devices indicating the presence of the one or more mobile devices within a detectable proximity of the reading device. For example, a computer system may include one or more Radio Frequency Identification ("RFID") reader devices that are configured to receive RFID tag signals and/or messages from one or more location-aware mobile devices within a proximity that is detectable by the computer system. In various embodiments, location-aware capabilities may also be associated with devices that are configured with Bluetooth, WWI, RFID, and/or any other device that may be configured to detect the presence of a mobile device.

Computer system 102 may receive a message signal from a location-aware mobile device 106 when the location-aware mobile device 106 is within a detectable proximity of the computer system 102. The message signals may include a tag and/or signal that references a radio frequency associated with the location-aware mobile device 106. The message signals may also include one or ore tags and/or signals that indicate to the computer system 102 that the location-aware mobile device 106 is within a detectable proximity. Based on the message signal, the preference based content delivery system 100 may launch a web browser. If, for example, the message signal is associated with a user and/or location-aware mobile device 106 not known, the preference based content delivery system 100 may prompt the user to provide user profile information. If, however, the message signal is associated with a previous user, the preference based content delivery system 100 may display one or more web pages associated with a user configuring content to be accessed via a location-aware mobile device 106 during a commute.

Network 104 may communicate content message signals from the computer system 102 to the location-aware mobile device 106. The content message signals may be associated with, for example, video information and/or audio information, text data, hyperlinks, and/or other digital information, and/or combinations thereof. The content message signal may be used to access content that has been configured using a display module associated with the location-aware mobile device 106. Content may be video, audio, text, and/or other types of visual or audible information. In an exemplary embodiment, computer system 102 may include software and/or hardware to convert a content message signal from a text form to an audio form using text-to-speech conversion technologies.

Computer system 102 may be configured to continuously poll to determine whether a message signal associated with a location-aware mobile device 106 has been received using a location-aware reader. The computer system 102 may also aggregate the message signal data (e.g., a tag, etc.) included in the message to identify the location-aware mobile device 106.

In an exemplary embodiment, the location-aware mobile device 106 may be a hardware device that may receive a content message signal from the network 104, may cause display and/or playing of the content associated with the content message signal using a display module and/or speaker module associated with the location-aware mobile device 106, and may communicate messages to the network 104. For example, the location-aware mobile device 106 may cause display of text data using a display module associated with the location-aware mobile device 106.

The location-aware mobile device 106 may include wireless telephones, cellular telephones, mobile telephones, and/or satellite telephones, Personal Digital Assistants (PDA), portable computers, handheld MP3 players, handheld video players, personal media players, watches, gaming devices, Global Positioning System (GPS) navigation devices, portable televisions, an automobile radio, an automobile navigation system, an automobile multimedia system, and/or any other hardware device with location-aware capabilities and that is capable of receiving content message signals.

It is noted that preference based content delivery system 100 illustrates a simplified view of various components included in a preference based content delivery system 100, and that other hardware devices and software not depicted may be included in the preference based content delivery system 100. It is also noted that the preference based content delivery system 100 illustrates only a single computer system 102, a single location-aware mobile device 106, and a single network 104. It will be appreciated that multiple instances of these devices may be used. The computer system 102 and the location-aware mobile device 106 are discussed in further detail below.

Figure 2:
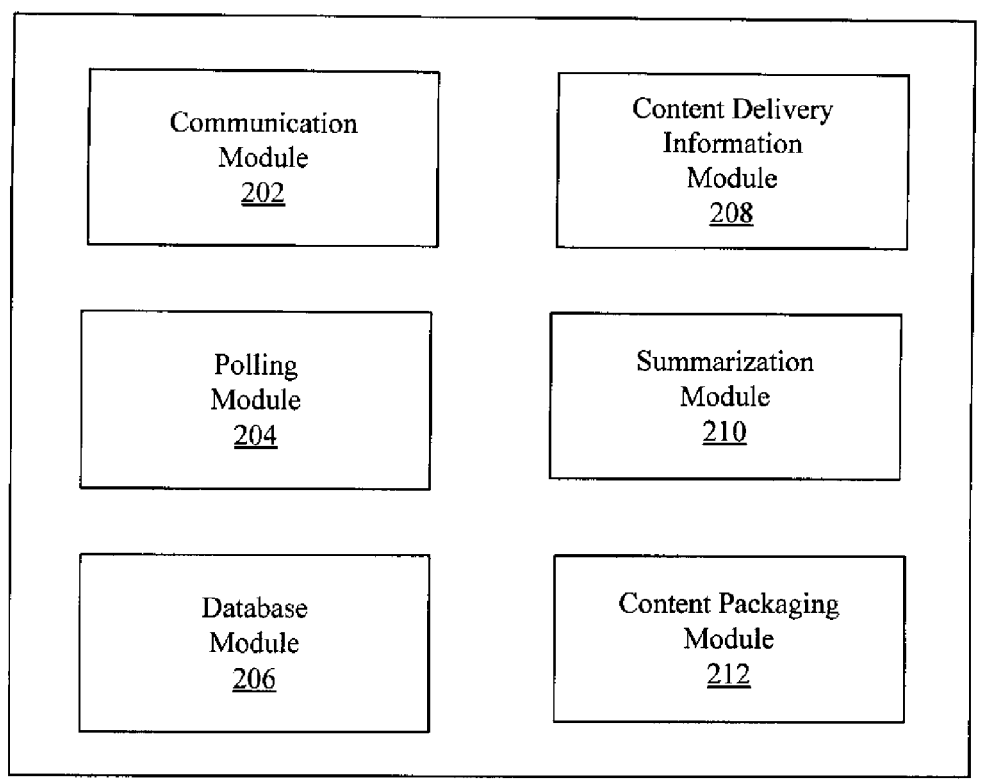
FIG. 2 illustrates exemplary modules of a computer system in accordance with exemplary embodiments.

FIG. 2 illustrates various modules of the computer system 102 in accordance with exemplary embodiments. In an exemplary embodiment, the computer system 102 may include a communication module 202, a polling module 204, a database module 206, a content delivery information module 208, a summarization module 210, and a content packaging module 212. It is noted that the modules 202, 204, 206, 208, 210, and 212 are exemplary. The functions of the modules 202, 204, 206, 208, 210, and 212 may be performed at other modules remote or local to the computer system 102, and the modules 202, 204, 206, 208, 210, and 212 may be combined and/or separated.

The database module 206 may have access to user profile information created by one or more users associated with one or more location-aware mobile devices 106. The database module 206 may include software and/or hardware to store and/or analyze the user profile information to determine if a profile is associated with a particular location-aware mobile device 106. The database module 206 may identify user profile information associated with a location-aware mobile device 106 by assigning a unique identification number to each user profile associated with a particular tag and/or location-aware mobile device 106.

The database module 206 may also include software and/or hardware to analyze the user profile information associated with the user profile. User profile information may include an Email address, First Name, Last Name, Telephone Number, and/or Carrier Name associated with a user and/or location-aware mobile device 106. For example, a user may be associated with the following user profile information: Email Address—janedoe@acme.com, First Name—Jane, Last Name—Doe, Telephone Number—(555) 555-5555, Carrier Name—ABC Wireless.

The database module 206 may also update user profile information as it is modified by a user associated with the location-aware mobile device 106. For example, a user may change carriers from ABC Wireless to DEF Wireless. Accordingly, the user may modify his/her user profile information to change the carrier name to reflect this change in carriers. The database module 206 may update the user profile information based on these changes.

Polling module 204 may include software and/or hardware to continuously check if one or more message signals have been received from one or more location-aware mobile devices 106. The polling module 204 may periodically receive messages from the location-aware mobile device 106 when the location-aware mobile device 106 is within a detectable proximity. Messages may include tag data signals (e.g., a tag, etc.) that references a specific radio frequency associated with the location-aware mobile device 106. Messages may also include one or ore tags and/or signals that indicate to the computer system 102 that the location-aware mobile device 106 is within a detectable proximity. Based on one or more messages received from the location-aware mobile device 106, the computer system 102 may launch a web browser that may access one or more web pages to display information associated with a user configuring content to be accessed via a location-aware mobile device 106.

If, for example, the one or more messages received are not associated with a user and/or location-aware mobile device 106 known to the computer system 102, one or more web pages may be displayed to prompt the user to input user profile information. If, however, the one or more messages received are associated with a user and/or location-aware mobile device 106 known to the computer system 102, one or more web pages may be displayed to prompt the user to configure content to be accessed via a location-aware mobile device 106. Accordingly, the computer system 102 may access the database module 206 to analyze the user profile information.

Content delivery information module 208 may include software and/or hardware to receive, search for, manipulate, access, and/or display content delivery information. Content delivery information may include one or more content items that are of interest to a user that are configured for subsequent access via a location-aware mobile device 106. For example, content delivery information may include information associated with blogs, links to blogs, news feeds, links to news feeds, locations, personal notes, and/or any other information that may be of interest to the user.

Content delivery information module 208 may search for content delivery information based on input received from a user using a search feature on one or more web pages associated with the preference based content delivery system 100. For example, a user may be interested in viewing all articles on the front page of the New York Times news paper. The user may use the search feature on the one or more web pages to input a search query for a news feed associated with the front page of the New York Times. Based on this input, content delivery information module 208 may search for and return back one or more search results associated with a news feed with the front page of the New York Times. Content delivery information module 208 may also receive input from a user indicating whether a search result should be designated as content delivery information.

Content delivery information module 208 may manipulate content delivery information based on input from a user using manipulation features, such as, drag and drop, cut and paste, and/or any other manipulation features that may allow a user to manipulate content delivery information, associated with one or more web pages associated with the preference based content delivery system 100. For example, a user may rearrange the display of one or more content items of the content delivery information. In various exemplary embodiments, content delivery information module 208 may also receive an amount associated with an approximate length of time of a subsequent commute as input from the user and/or preference based content delivery system 100.

Summarization module 210 may include software and/or hardware to access content delivery information and/or summarize content delivery information associated with one or more news feeds and/or one or more electronic documents based on the commute time. Summarization module 210 may summarize the content delivery information by extracting only the headlines of all and/or a portion of the content delivery information, extracting abstract summaries of all and/or a portion of the content delivery information, and/or using a summarization engine on all and/or a portion of the content delivery information based on the commute time and an average reading speed variable.

The average reading speed variable may be determined and/or set by the implementers of the preference based content delivery system 100. In various exemplary embodiments, the average reading speed variable may be determined and/or set by a user using the preference based content delivery system 100. The average reading speed variable may also be determined and/or set by the preference based content delivery system 100.

A summarization engine may include out-of-the-box and/or customized hardware and/or software that receives all and/or a portion of the content delivery information and summarizes the information, based on a commute time of a user, the average reading speed variable, and/or the amount of content delivery information, to an amount of information that may be reviewed by the user during a subsequent commute. Summarization module 210 may also prioritize which content delivery information is summarized to include less information and/or which content delivery information is summarized to include more information. In various exemplary embodiments, summarization module 210 may prioritize the content delivery information based on the way in which the user has arranged the content delivery information.

For example, content delivery information associated with a user may include a news feed associated with the front page of the New York Times news paper and a news feed associated with the front page of the Wall Street Journal news paper. In this example, the user may input a commute time of 15 minutes. Based on the 15 minute commute time, the amount of content delivery information, and the average reading speed variable, the summarization module 210 may summarize the content delivery information to only provide the headlines of all the articles associated with all the news feeds. In another example, the user may input a commute time of 30 minutes. Based on the 30 minute commute time, the amount of content delivery information, and the average reading speed variable, the summarization module 210 may summarize the content delivery information to only provide the abstract summaries of all the articles associated with all the news feeds. In yet another example, the user may input a commute time of 1 hour. Based on the 1 hour commute time, the amount of content delivery information, and the average reading speed variable, the summarization module 210 may summarize the content delivery information using the summarization engine, which may provide portions of all the articles associated with all the news feeds.

Content packaging module 212 may include software and/or hardware to access the summarized content delivery information and/or format the summarized content delivery information into a content package for subsequent display on a location-aware mobile device 106. Content packaging module 212 may format the summarized content delivery information by rearranging and/or manipulating the summarized content delivery information. For example, content packaging module 212 may arrange the summarized content delivery information such that all information associated with one or more news feeds may be displayed first, all information associated with one or more locations may be displayed second, and all information associated with one or more personal notes may be displayed third.

Content packaging module 212 may also format the summarized content delivery information to be able to be displayed on a screen associated with the location-aware mobile device 106. For example, content packaging module 212 may format the summarized content delivery information to be able to be displayed on a smaller or larger screen than the screen associated with the computer system 102.

Content packaging module 212 may also be configured to send an electronic message, such as a content message, to the location-aware mobile device 106 associated with the summarized content delivery information once the location-aware mobile device 106 is no longer in a detectable proximity to the computer system 102. A content message may include a text message, electronic mail message, and/or instant message. A content message may also include one or more hyperlinks associated with the content package.

Communication module 202 may communicate content message signals from the computer system 102 to the network 104. The communication module 202 may also communicate messages received from the other modules 204, 206, 208, 210, and 212 to the network 104, and may communicate messages to the other modules 204, 206, 208, 210, and 212 received from the network 104. The communication module 202 may also generate the content message signal (e.g., one or more hyperlinks associated with the content package) and may communicate the content message signal to the location-aware mobile device 106.

Figure 3:
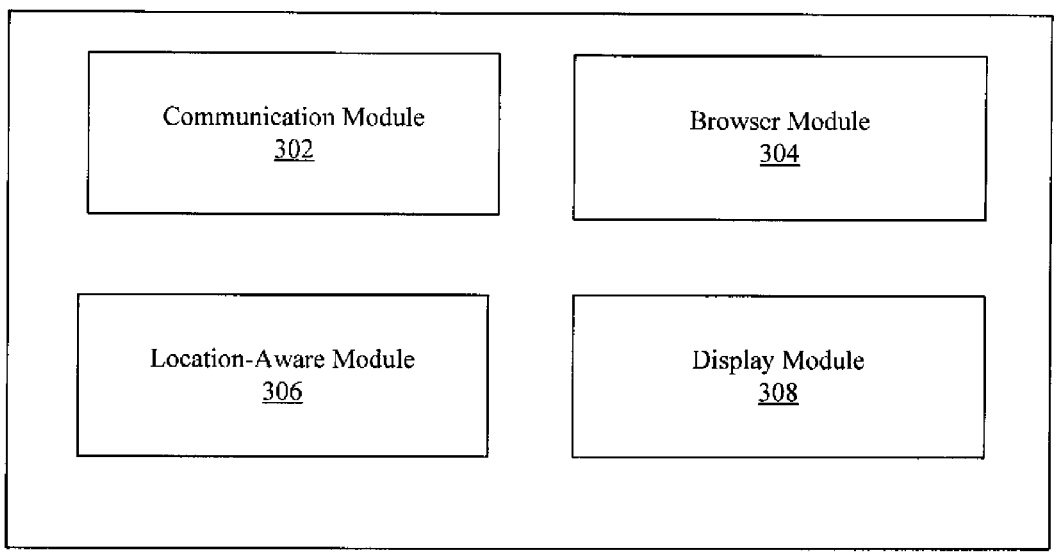
FIG. 3 illustrates exemplary modules of a location-aware mobile device in accordance with exemplary embodiments.

FIG. 3 illustrates exemplary modules of a location-aware mobile device 106 in accordance with exemplary embodiments. The location-aware mobile device 106 may receive the content message signal from the computer system 102 via the network 104 and may cause display/playing of the content package associated with the content message signal.

In an exemplary embodiment, the location-aware mobile device 106 may include a communication module 302, a browser module 304, a location-aware module 306, and a display module 308. It is noted that the modules 302, 304, 306, and 308 are exemplary. The functions of the modules 302, 304, 306, and 308 may be performed by other modules remote or local to the location-aware mobile device 106, and the modules 302, 304, 306, and 308 may be combined and/or separated.

Communication module 302 may provide communication between the location-aware mobile device 106 and the network 104. The communication module 302 may forward the content message signal and/or messages received from the network 104 to the other modules 304, 306, and 308 and may communicate messages received from the modules 304, 306, and 308 to the network 104.

The browser module 304 may include a web browser client installed on the location-aware mobile device 106, such as, but not limited to, INTERNET EXPLORER™, NAVIGATOR™, or FIREFOX™ web browser programs, offered by Microsoft Corporation of Redmond, Wash., Time Warner of New York, N.Y., and the Mozilla Foundation of Mountain View, Calif., respectively.

The web browser may be used to receive and/or access information from the computer system 102. For example, the web browser may be used to access a content package via the location-aware mobile device 106.

The location-aware module 306 may provide preferences to be set with regard to location-aware capabilities. For example, a user may enable one or more location-aware capabilities using the location-aware module 306. In addition, a user may set how often the location-aware module 306 may transmit message signals associated with one or more tags and/or signals that indicate to the computer system 102 that the location-aware mobile device 106 is within a detectable proximity. For example, the location-aware module 306 may be configured to transmit message signals at predetermined intervals, when events occur, and/or based on some other occurrence. For example, the messages may be configured to be sent every 5 seconds.

The display module 308 may control display/play of the content package and/or various graphical user interfaces associated with the location-aware mobile device 106. To cause display of the content package, the display module 308 may receive an activation of the one or more hyperlinks signal from a user input device associated with the location-aware mobile device 106 (e.g., key-board, stylus, scroll bar and the like) and may display/play the content package. The display module 308 may also cause display of a graphical user interface associated with the web browser.

FIG. 4 illustrates a user profile graphical user interface in accordance with exemplary embodiments. The user profile graphical user interface 400 may permit the user to input, edit, delete, and/or modify user profile information.

In an exemplary embodiment, the user profile graphical user interface 400 may be displayed in response to a message signal being received that is associated with a user and/or a location-aware mobile device 106 that is not known to the preference based content delivery system 100. For example, a location-aware mobile device 106 associated with a user may be detected by computer system 102. If, for example, the message signal associated with the location-aware mobile device 106 is not known to the preference based content delivery system 100, a user profile graphical user interface 400 may prompt the user to provide user profile information.

By way of non-limiting example, the user profile graphical user interface 400 may be arranged as depicted in FIG. 4. The user profile screen may include one or more data fields 404 associated with an Email address, a First Name, a Last Name, a Phone Number, and/or a Carrier Name. Near the top of the of the user profile screen, the user may input an Email address using a Email address data field. A user may input a first name using a First Name data field. A user may input a telephone number using a Phone # data field. A user may also input a carrier name using a Carrier data field. In addition, a user may submit the user profile information to the preference based content delivery system 100 by activating (e.g., clicking on, etc.) an Add button 402.

Figure 5:
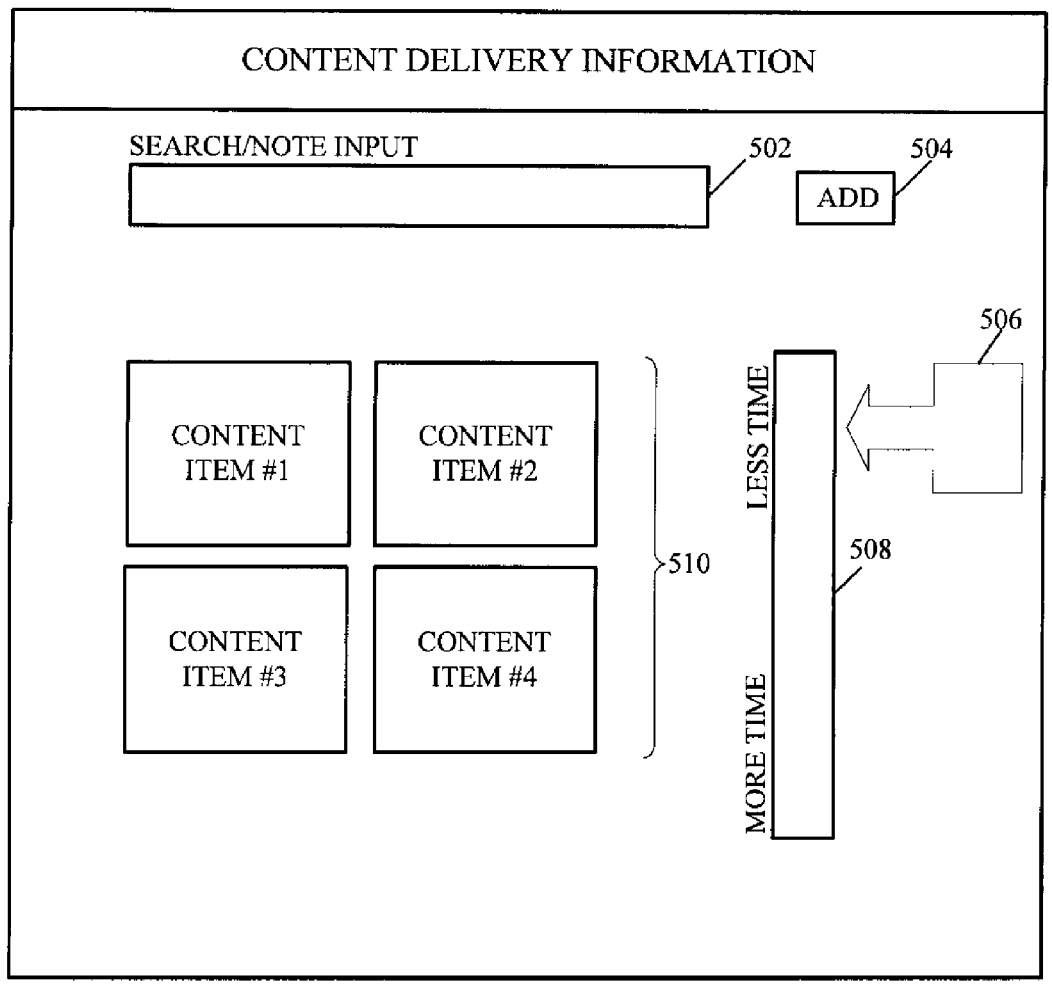
FIG. 5 illustrates a content delivery information graphical user interface in accordance with exemplary embodiments.

FIG. 5 illustrates a content delivery information graphical user interface in accordance with exemplary embodiments. The content delivery information graphical user interface 500 may permit the user to input, manipulate, edit, view, and/or search for content delivery information.

In an exemplary embodiment, the content delivery information graphical user interface 500 may be displayed in response to a message signal being received that is associated with a user and/or a location-aware mobile device 106 that is known to the preference based content delivery system 100. For example, a location-aware mobile device 106 associated with a user may be detected by computer system 102. If, for example, the message signal associated with the location-aware mobile device 106 is known to the preference based content delivery system 100, a content delivery information graphical user interface 500 may prompt the user to input, manipulate, edit, view, and/or search for content delivery information.

By way of non-limiting example, the content delivery information graphical user interface 500 may be arranged as depicted in FIG. 5. Near the top of the of the content delivery information screen, the user may input a search query for content of interest, such as, information associated with a news feed, blog, location, and/or any other content of interest using a Search/Note Input data field 502. For example, a user may input the search query "New York Times." A user may also input one or more personal notes using a Search/Note Input data field 502. For example, a user may input the personal note "Pick Up Dry Cleaning."

One or more search results and/or one or more personal notes may be added to the content delivery information by activating (e.g., clicking on, etc.) an Add button 504. In various embodiments, a user may add one or more search results and/or one or more personal notes by using functions such as, dragging and dropping, cutting and pasting, and/or any other similar functions for manipulating data. Once the one or more search results and/or one or more personal notes have been added to the content delivery information, each search result and/or personal note may become a content item. Content items 1, 2, 3, and 4 510 may be rearranged and/or manipulated by the user.

In addition, a user may input an amount associated with an approximate length of time of a subsequent commute using a time slider 508 and/or a time slider indicator 506. For example, a user may input a commute time by adjusting a time slider 508 up or down using a time slider indicator 506.

Figure 6:
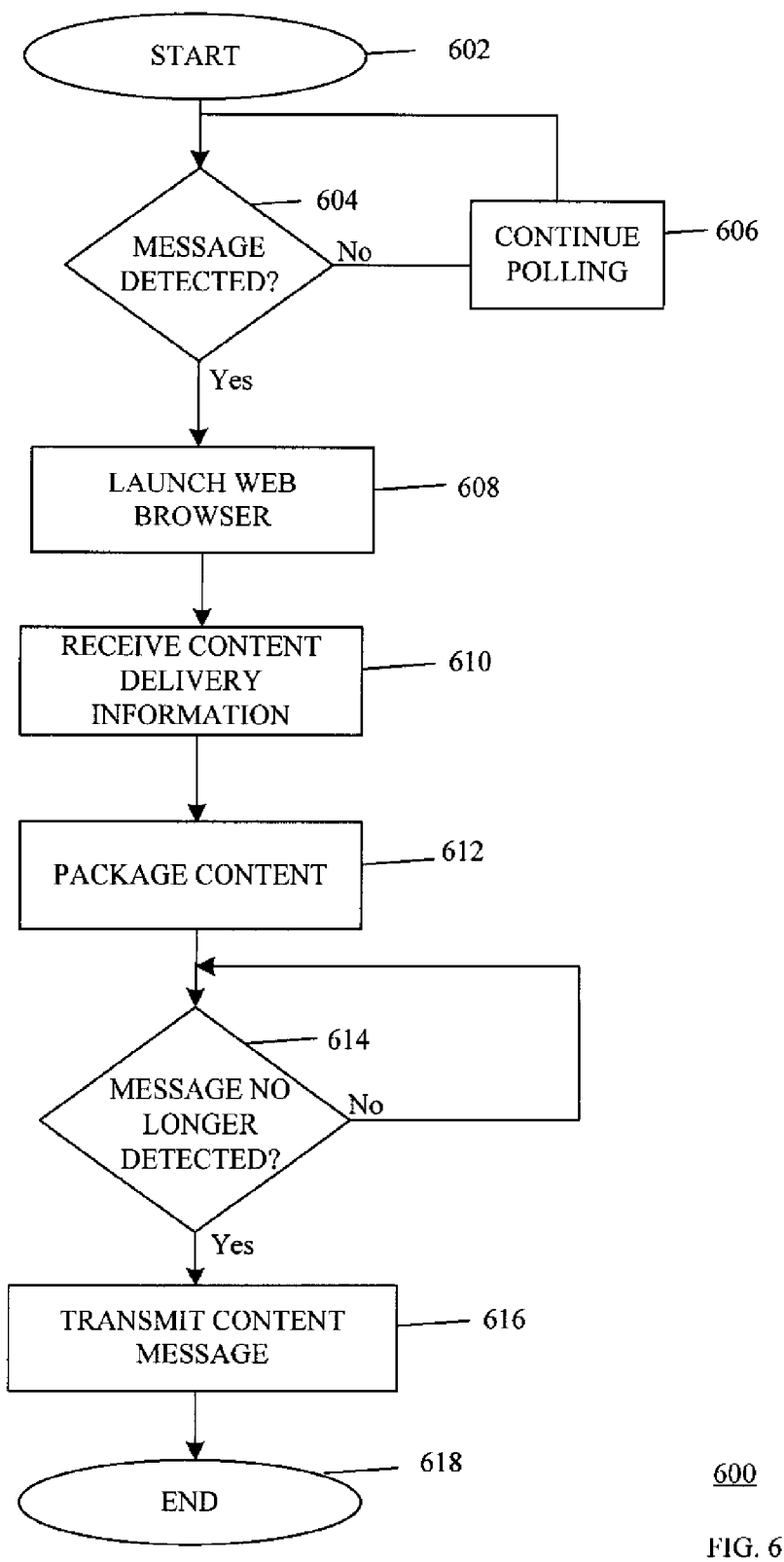
FIG. 6 illustrates a method for seamlessly providing preference based content to a location-aware mobile device.

FIG. 6 illustrates a method for seamlessly providing preference based content to a location-aware mobile device 106 in accordance with exemplary embodiments. This exemplary method is provided by way of example, as there are a variety of ways to carry out methods disclosed herein. The method 600 shown in FIG. 6 can be executed or otherwise performed by one or a combination of various systems. The method 600 is described below as carried out by the preference based content delivery system 100 shown in FIG. 1 by way of example, and various elements of the preference based content delivery system 100 are referenced in explaining the example method of FIG. 6. Each block shown in FIG. 6 represents one or more processes, methods, or subroutines carried in the exemplary method 600. Referring to FIG. 6, the exemplary method 600 may begin at block 602.

In block 604, the method may include consistently checking a location-aware reader associated with a computer system 102 to determine if one or more message signals have been received. If, for example, one or more message signals have not been received by computer system 102, the method may continue checking in block 606. If, however, one or more message signals have been received, the method may continue to block 608.

In block 608, the method may include launching a web browser and one or more web pages. In addition, the method may include comparing one or more message signals and/or a phone number associated with the location-aware mobile device 106 with one or more message signals and/or phone numbers stored in database module 206. If, for example, the message signal associated with the location-aware mobile device 106 is not associated with any of the user profile information stored in database module 206, a user profile graphical user interface web page may be launched to prompt the user to provide user profile information. If, however, the message signal associated with the location-aware mobile device 106 is associated with user profile information stored in database module 206, a content delivery information graphical user interface web page may be launched using the message signal. The method may then continue to block 610.

In block 610, the method may include receiving content delivery information from the user using a content delivery information graphical user interface web page. A user may search for and/or input content of interest using the content delivery information web page. For example, a user may be interested in viewing all articles associated with the front page of the New York Times news paper. A user may use the content delivery information web page to input a search query for one or more news feeds associated with the front page of the New York Times news papers. A user may then designate one or more search results as a content item and/or content delivery information. In addition, a user may input one or more personal notes, such as, "Pick Up Dry Cleaning." The user may then designate and/or add the one or more personal notes as content items and/or content delivery information. A user may also input an approximate commute time associated with a subsequent commute. The method may then continue to block 612.

In block 612, the method may include creating a content package based on the commute time of the user, the amount of content delivery information received in block 610, and an average reading speed variable. Creating a content package may include summarizing the content delivery information such that the content package includes a sufficient amount of information for the user to view throughout the duration of his/her commute.

For example, content delivery information associated with a user may include a news feed associated with the front page of the New York Times news paper and a news feed associated with the front page of the Wall Street Journal news paper. In this example, the user may input a commute time of 15 minutes. Based on the 15 minute commute time, the amount of content delivery information, and the average reading speed variable, a summarization module 210 may summarize the content delivery information to only provide the headlines of all the articles associated with all the news feeds. In another example, the user may input a commute time of 30 minutes. Based on the 30 minute commute time, the amount of content delivery information, and the average reading speed variable, a summarization module 210 may summarize the content delivery information to only provide the abstract summaries of all the articles associated with all the news feeds. In yet another example, the user may input a commute time of 1 hour. Based on the 1 hour commute time, the amount of content delivery information, and the average reading speed variable, a summarization module 210 may summarize the content delivery information using a summarization engine, which may provide portions of the articles associated with all the news feeds.

In block 612, the method may also create a content package based on the summarized content delivery information and/or content package formatting. For example, the content package may be formatted such that a screen associated with the location-aware mobile device 106 may be used to view the information associated with the content package with ease. The method may then continue to block 614.

In block 614, the method may include consistently checking a location-aware reader associated with a computer system 102 to determine if one or more message signals are no longer detected. If, for example, one or more message signals are detected by computer system 102, the method may continue checking in block 614. If, however, one or more message signals are no longer detected, the method may continue to block 616.

In block 616, the method may include transmitting a content message signal to the location-aware mobile device using network 104. The content message signal may include one or more hyperlinks associated with the content package. Once the user has activated the one or more hyperlinks, the user may view the information associated with the content package on the location-aware mobile device 106 during the course of his/her commute.

In various exemplary embodiments, while the user views the information associated with the content package on the location-aware mobile device 106, the user may identify a portion of and/or all the information as information that the user would like to review in full version form. Once the user and/or location-aware mobile device 106 return within a detectable proximity to the computer system 102, a web browser may be automatically launched displaying the full versions of the information that the user identified. The method 600 may then end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
   detecting, at a computer system, a location-aware mobile device being within a detectable proximity of the computer system;
   receiving, from a user associated with the location-aware mobile device, a selection of content;
   formulating a content package that comprises a summarized version of the selected content, wherein the summarized version of the selected content has a size and the formulating step comprises using a commute time and a reading speed associated with the user to set the size of the summarized version of the selected content;
   sending a content message to the location-aware mobile device in response to determining that the location-aware mobile device is no longer within the detectable proximity of the computer system, wherein the content message comprises a hyperlink for accessing the content package; and
   the computer system, in response to detecting the location-aware mobile device being within the detectable proximity of the computer system, launching a web browser and causing the browser to display a web page associated with a full version of information provided in the content package that has been designated for full version review by the user.

2. The method of claim 1, further comprising receiving user profile information associated with the user.

3. The method of claim 2, wherein user profile information includes at least one of: an electronic mail address, a first name, a last name, a telephone number, and a carrier name.

4. The method of claim 1, wherein the content is selected from one or more search results for one or more content items of interest based on user input.

5. The method of claim 1, wherein the selected content comprises a plurality of articles, and wherein the summarized version of the selected content comprises only headlines of the articles or only abstract summaries of the articles.

6. The method of claim 1, wherein the content message includes at least one of: a text message, an electronic mail message, and an instant message.

7. The method of claim 1, wherein the step of formulating the content package comprises summarizing the selected content.

8. The method of claim 7, wherein
the selected content comprises a news feed associated with a news article,
the step of summarizing the selected content comprises extracting the headline of the news article, and
the step of formulating the content package comprises including the extracted headline in the content package but excluding the body of the article from the content package.

9. A system, comprising:
a database having data for display; and
a network-enabled computer system configured to:
detect a location-aware mobile device being within a detectable proximity of the computer system;
receive, from a user associated with the location-aware mobile device, a selection of content from among the data in the database, the selected content matching an interest of the user;
formulate a content package that comprises a summarized version of the selected content, wherein the summarized version of the selected content has a size and the computer system is configured to formulate the content package by using a commute time and a reading speed associated with the user to set the size of the summarized version of the selected content; and
send a content message to the location-aware mobile device in response to determining that the location-aware mobile device is no longer within the detectable proximity of the computer system, wherein the content message comprises a hyperlink for accessing the content package, wherein
the network-enabled computer system is further configured, such that, in response to detecting the location-aware mobile device being within the detectable proximity of the network-enabled computer system, the network-enabled computer system launches a web browser and causes the browser to display a web page associated with a full version of information provided in the content package that has been designated for full version review by the user.

10. The system of claim 9, wherein the location-aware mobile device is one of: a cellular telephone, a portable computer, a watch, a gaming device, a personal media player, a portable television, a Global Positioning System navigation device, and a personal digital assistant.

11. The system of claim 9, wherein the database stores user profile information.

12. The system of claim 9, wherein the computer system is configured to search the database for a data portion that matches the interest of the user, wherein the content is selected from the data portion.

13. A computer program product comprising a non-transitory computer-accessible medium encoded with computer program code that, when executed by a computer system, causes the computer system to:
detect a location-aware mobile device being within a detectable proximity of the computer system;
summarize content selected by a user using a commute time and a reading speed associated with the user; and
sending a content message to the location-aware mobile device in response to determining that the location-aware mobile device is no longer within the detectable proximity of the computer system, wherein the content message comprises a hyperlink for accessing the summarized content, wherein
the computer program code is configured to cause the computer system to, in response to detecting the location-aware mobile device being within the detectable proximity of the network-enabled computer system, launch a web browser and cause the browser to display a web page associated with a full version of information provided in the content package that has been designated for full version review by the user.

* * * * *